Patented Sept. 4, 1951

2,566,665

UNITED STATES PATENT OFFICE 2,566,665

ZIRCONIUM AND HAFNIUM SEPARATION PROCESS

Eugene H. Huffman, Berkeley, and Loren J. Beaufait, Jr., North Richmond, Calif., assignors to the United States of America as represented by the United States Atomic Energy Commission No Drawing. Application August 23, 1949, Serial No. 111,966

7 Claims. (Cl. 23—15)

The present invention relates to a process for the separation of hafnium and zirconium from each other. More particularly, it relates to an extraction process employing the different distributive properties of chelated beta-diketone compounds of zirconium and hafnium between two different liquid phases.

The chemical properties of hafnium and zirconium are in general very similar, specific differences in properties being relegated to secondary roles such as the relative solubilities of their corresponding compounds. Aqueous solutions of zirconium in moderate concentrations also tend to polymerize and form colloidal solutions which further complicate separation procedures. These facts have made efforts to separate these two elements from each other very difficult. In the past, separations of zirconium and hafnium have been achieved chiefly by processes involving fractional crystallizations and fractional precipitations of their various compounds; such processes by their very nature involve enormous amounts of time, labor, and starting materials to produce appreciable amounts of these elements in relatively pure form.

It is therefore an object of the present invention to provide a highly effective process for separating hafnium and zirconium from each other and in high purity.

Another object of the invention is to provide an improved process, wherein hafnium and zirconium are separated from each other and in high purity more efficiently and quickly than has heretofore been possible.

These and other objects of the invention, and the various advantages thereof, are set forth in the following description.

The process of the present invention comprises the single or multiple extraction of an aqueous phase containing zirconium and hafnium with a water-immiscible phase containing a beta-diketone whose chelating properties may be preferentially directed to the chelation of zirconium or hafnium by adjusting various experimental factors hereinafter more fully described.

In general, beta-diketones (RCO CH$_2$ COR') are characterized by existence in the two tautomeric forms, keto and enol; the amounts of the two forms in equilibrium being chiefly a function of the composition of the two end groups, R and R'. The equilibrium between these two tautomeric forms may be represented by the following equation:

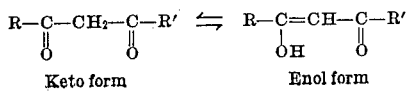

The enol form of beta-diketones is capable of reacting with metallic ions to form compounds which are called "chelate" compounds after the claw-like mode of attachment between the metallic component and organic portions in the structure of the compounds, e. g.,

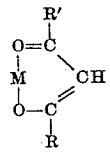

Since such chelate compounds are slightly soluble in aqueous solution and soluble in organic liquids, it is possible to remove metallic ions from an aqueous solution by extraction of said solution with water immiscible phase containing a beta-diketone, whereupon the metallic chelate is formed and simultaneously extracted into the organic phase. The general reaction between a plus-$n$ metallic ion and a water-immiscible solution of a beta-diketone which may be represented as a weak acid, HK, is as follows:

$$M^{+n} + nHK = MK_n + nH^+$$

The equilibrium constant, K', for this reaction is given by the following expression:

$$K' = \frac{(MK_n)_o (H^+)^n_a}{(M^{+n})_a (HK)^n_o}$$

wherein the parenthetical values represent the concentrations, or more accurately, the activities of the species enclosed therein and the subscripts $o$ and $a$ refer respectively to the liquid phases, non-aqueous and aqueous, in which that species is soluble, e. g., the metal chelate, MK$_n$, as denoted by the subscript, $o$, is soluble in the non-aqueous phase. It may be further seen that the quantity $(MK_n)_o/(M^{+n})_a$ represents the extraction coefficient of the metal, M, between the non-aqueous and aqueous phases. Representing the extraction coefficient by the character E, we obtain from the above equilibrium expression the following relationship:

$$E = K' \frac{(HK)^n_o}{(H^+)^n_a}$$

Since the equilibrium constant K' remains constant at a particular temperature, the extraction coefficient E varies directly with the $n$th-power of the beta-diketone concentration and inversely with the $n$th-power of the hydrogen ion concentration.

Therefore by varying the concentrations of the beta-diketone and the hydrogen ion, the distribution of the metal, M, may be varied between the aqueous and non-aqueous phase in a controlled and efficient manner.

While the above discussion is limited to the situation governing the formation and extraction of one metallic chelate, it will be noted that to effect a separation of two or more metals from each other using these chelation-extraction principles the equilibrium constants of metals must differ appreciably from one another, otherwise, the metals would exhibit identical chelation and extraction properties when the concentrations of the beta-diketone and hydrogen ion are varied.

We have now discovered that the beta-diketone thenoyltrifluoroacetone, hereinafter referred to as TTA, exhibits sufficient differences in the chelation of zirconium and hafnium to make possible a separation of the said elements from each other in accordance with the above discussion.

We have further discovered that zirconium and hafnium may be separated from each other by single or multiple extractions of aqueous solutions containing the same elements with water immiscible solutions of TTA, wherein the hydrogen ion concentration of said aqueous solutions and the TTA concentrations in the water immiscible solutions are set at predetermined values.

As the results of numerous experiments on the distribution of hafnium and zirconium between 2 molar perchloric acid solutions and water immiscible solutions of TTA, we have determined $K'_{Zr}$ to be $1.8 \times 10^9$ and $K'_{Hf}$ to be $8.6 \times 10^7$.

It may be mentioned that while $K'$ as discussed previously is independent of the concentrations employed, the $K'$ for both zirconium and hafnium is dependent on the $H^+$ concentration in so far as it influences which species of metallic ion is present in the aqueous solution. It is believed that in 2 molar perchloric acid solutions containing concentrations of hafnium and zirconium below $2 \times 10^{-3}$ molar, the principal metallic species are $Zr^{+4}$ and $Hf^{+4}$ (i. e., $n=4$). Aqueous solutions containing practical quantities of zirconium and hafnium at $H^+$ concentrations below 2 molar tend to hydrolyze and form colloidal solutions, a situation which is to be avoided.

In carrying out our invention, an aqueous solution of zirconium and hafnium is singly or multiply extracted with a water immiscible solvent containing TTA, whereupon metallic chelates of the above elements are formed and extracted into the said solvent according to the prevailing equilibrium conditions.

After the extraction process, any hafnium or zirconium present in the aqueous phase may be recovered by the use of various well known precipitation reactions, such as the precipitation of hafnium and zirconium hydroxides by the addition of ammonium hydroxide. Those elements present in the non-aqueous phase as chelate compounds may be recovered by the extraction of the said phase with an aqueous phase in which the hydrogen ion concentration is in excess of that originally employed, whereby the equilibrium is reversed and the elements enter the aqueous phase, from which they may be obtained as mentioned above.

While a variety of acids may be used as the hydrogen ion source in the practice of our invention, it is preferable to use an acid which does not exhibit complexing tendencies, such as sulfuric acid, perchloric acid, and the like. In this respect, we have found that perchloric acid, because of its small tendency to complex metallic ions, gives excellent results.

The use of benzene as the water immiscible solvent has been found to be well suited for the practice of our invention, although other water immiscible solvents may be used, providing TTA and the chelates of zirconium and hafnium are soluble in them.

The following examples are further illustrative of the process of this invention.

Example I

One hundred and fifty milliliters of a 2 molar perchloric acid solution containing 22.9 mg. of Hf and 13.6 mg. of Zr was prepared by dissolving the appropriate amounts of $ZrOCl_2 \cdot 8H_2O$ and $HfOCl_2 \cdot 8H_2O$ in 2 molar perchloric acid. This solution was twice extracted with 150 ml. portions of 0.025 molar TTA in benzene at room temperature.

The hafnium recovered from the separated aqueous phase (precipitated as the hydroxide by the addition of excess ammonium hydroxide) amounted to 6.31 mg. Spectrographic analysis of the recovered Hf showed the presence of less than 1.2% Zr based on the hafnium present.

Example II

Three hundred milliliters of a 2 molar perchloric acid solution containing 78.6 mg. of Hf and 3.93 mg. of Zr was prepared by dissolving the appropriate amounts of $ZrOCl_2 \cdot 8H_2O$ and $HfOCl_2 \cdot 8H_2O$ in 2 molar perchloric acid.

Three extractions of this solution at room temperature with 300 ml. portions of 0.02 molar TTA in benzene gave an aqueous solution which contained 39.4 mg. of Hf. Spectrographic analysis showed that the Hf recovered from the aqueous solution (precipitated as the hydroxide by the addition of excess ammonium hydroxide) had a 0.4% Zr content.

It will be understood that the above examples are for illustrative purposes only and that similar results may be obtained by various modifications of the above procedures without departing from the spirit and scope of this invention as defined in the following claims.

What is claimed is:

1. In a method for separating zirconium and hafnium values from each other, the steps comprising contacting an acidulated aqueous phase containing zirconium and hafnium ions with a water-immiscible phase containing thenoyltrifluoroacetone, whereupon the zirconium is preferentially chelated and extracted into the water-immiscible phase and finally recovering the separated hafnium and zirconium values from said aqueous and water-immiscible phases respectively.

2. The method according to claim 1, wherein the acidulated aqueous phase is a perchloric acid solution of hafnium and zirconium compounds.

3. The method according to claim 1, wherein the water-immiscible phase is a benzene solution of thenoyltrifluoroacetone.

4. In a method for separating zirconium and hafnium values from each other, the steps comprising contacting an aqueous phase containing zirconium and hafnium ions in a 2 molar solution of perchloric acid with successive portions of a benzene phase containing thenoyltrifluoroacetone, to preferentially chelate and extract zirconium into the benzene phase, and finally recovering the separated hafnium and zirconium values from said aqueous and benzene phases.

5. In a method for separating zirconium and hafnium values from each other, the steps comprising contacting an aqueous perchloric acid phase containing zirconium and hafnium ions with a benzene phase containing thenoyltrifluoracetone, whereupon zirconium is preferentially extracted into said benzene phase, separating said phases, and recovering the hafnium and zirconium values from said perchloric acid and benzene phases respectively.

6. The process according to claim 5, wherein the perchloric acid concentration in said aqueous perchloric acid phase is approximately 2M.

7. In a process for separating zirconium and hafnium values from each other including the production and treatment of an acidulated aqueous phase containing ions of zirconium and hafnium, the step comprising contacting a water-immiscible phase containing thenoyltrifluoracetone with said aqueous phase to preferentially chelate and extract zirconium therefrom.

EUGENE H. HUFFMAN.
LOREN J. BEAUFAIT, Jr.

REFERENCES CITED

The following references are of record in the file of this patent:

Connick et al., Jour. Am. Chem. Soc., vol. 71, Sept. 1949, pages 3182-3191.

Huffman et al., Jour. Am. Chem. Soc., vol. 71, Sept. 1949, pages 3179-3182.